(12) United States Patent
Heath et al.

(10) Patent No.: US 10,455,808 B1
(45) Date of Patent: *Oct. 29, 2019

(54) ANIMAL MARKING MACHINE (71) Applicant: VIUM INC, San Mateo, CA (US)

(72) Inventors: Kyle Howard Heath, Menlo Park, CA (US); Jonathan Betts-Lacroix, Belmont, CA (US)

(73) Assignee: Vium, Inc, San Mateo, CA (US)

( * ) Notice: Subject to any disclaimer, the term of this patent is extended or adjusted under 35 U.S.C. 154(b) by 744 days.

This patent is subject to a terminal disclaimer.

(21) Appl. No.: 14/872,068

(22) Filed: Sep. 30, 2015

(51) Int. Cl.
*A01K 11/00* (2006.01)
*G06K 1/12* (2006.01)
*G06K 5/02* (2006.01)

(52) U.S. Cl.
CPC .......... *A01K 11/005* (2013.01); *A01K 11/006* (2013.01); *G06K 1/121* (2013.01); *G06K 5/02* (2013.01)

(58) Field of Classification Search
CPC .... A01K 11/00; A01K 11/005; A01K 11/006; A01K 1/031; A01K 1/613
See application file for complete search history.

(56) References Cited

U.S. PATENT DOCUMENTS

| 3,633,584 | A | * | 1/1972 | Farrell | A01K 11/005 |
| | | | | | 101/19 |
| 5,725,261 | A | | 3/1998 | Lake | |
| 6,892,671 | B1 | * | 5/2005 | Miyawaki | A01K 11/006 |
| | | | | | 119/174 |
| 7,400,742 | B2 | * | 7/2008 | Popp | G07C 9/00111 |
| | | | | | 235/375 |
| 9,578,853 | B1 | * | 2/2017 | Heath | A01K 11/005 |
| 2002/0066418 | A1 | * | 6/2002 | Fearing | A01K 11/004 |
| | | | | | 119/859 |

(Continued)

FOREIGN PATENT DOCUMENTS

CN  202190620 U  4/2012
EP  836439 A1  4/1998

(Continued)

OTHER PUBLICATIONS

Hidalgo, Manuel; Patient-derived xenograft models; Cancer Discovery AACR Journals; Jul. 15, 2014 ; 17 pages.

(Continued)

*Primary Examiner* — Alexander J Orkin
(74) *Attorney, Agent, or Firm* — Kim Rubin Patent Agent (57) ABSTRACT

A machine suitable for marking codes on rodent tails is disclosed, for marking both machine-readable and human-readable codes and such codes combined. An embodiment comprises two axes of motion: one aligned with the rodent tail and one perpendicular. Only one axis need move at one time for disclosed codes. One axis is linear motion of a marking head on a gantry. The second axis provides a rolling motion of the rodent tail. Codes include symbol sets consisting of orthogonal straight line segments, including both a reduced alphanumeric symbols set and a vine code with a marked spine. Delete markings and replacement locations are defined for marking error correction. Embodiments include mapping tables from animal codes as marked to animal IDs for use in managing animals in vivaria. The mapping tables also provide error detection.

14 Claims, 7 Drawing Sheets

(56) References Cited

U.S. PATENT DOCUMENTS

| | | | | |
|---|---|---|---|---|
| 2003/0024481 | A1* | 2/2003 | Kalscheur | A01K 11/006 119/174 |
| 2004/0220527 | A1* | 11/2004 | Buckley | A01K 11/00 604/191 |
| 2008/0247637 | A1* | 10/2008 | Gildenberg | A61B 34/70 382/153 |
| 2012/0226288 | A1* | 9/2012 | Mays | A01K 11/00 606/116 |
| 2018/0060620 | A1* | 3/2018 | Heath | G06K 7/1413 |

FOREIGN PATENT DOCUMENTS

| | | |
|---|---|---|
| JP | 2005189023 A | 7/2005 |
| WO | WO2008015277 A2 | 2/2008 |

OTHER PUBLICATIONS

Jacobs, Valerie; Current review of in vivo GBM rodent models; ASN Neuro; 3(3):art:e00063.doi:10.1042/AN20110014; Jul. 8, 2011; 11 pages.

Lodhia, K. A.; Prioritizing therapeutic targets using xenograft models; Elsevier; http://dx.doi.org/10.1016/j.bbcan.2015.03.002; Mar. 14, 2015; 12 pages.

Prerna Malaney; One mouse, one patient paradigm; Elsevier; http://dx.doi.org/10.1016/j.canlet.2013.10.010; Oct. 14, 2013; 12 pages.

Morton, Christopher L.; Human tumor xenografts in immunodeficient mice; Nature Protocols; Nature Publishing Group; doi: 10.1038/nprot.2007.25; Feb. 22, 2007; 4 pages.

Oh, Taemin; Murine models for the study of glioblastoma immunotherapy; Journal of Translational Medicine; doi: 10.1186/1479-5876-12-107; Apr. 29, 2014; 10 pages.

Williams, Samuel A.; Patient-derived xenografts, the cancer stem cell paradigm; Laboratory Investigation; USCAP, Inc; 0023-6837/13; Aug. 5, 2013; 13 pages.

Bell, Joline; Labstamp System: An Alternative method of ID; Powerpoint for demos, Somark Innovations; 2011; 25 pages.

RapID Lab: Automated Lab Animal ID; RapID Tag Product Guide; 13 pages.

Zebra.com; Bar codes help celera map human genome; https://www.zebra.com/content/dam/zebra/success.../celera-en-us.pdf; p. 2.

* cited by examiner

PRIOR ART

ANIMAL MARKING MACHINE

FIELD OF THE INVENTION

The invention relates to management of animals in a vivarium for both husbandry and study purposes. More specifically it relates to uniquely identifying animals in the vivarium. Yet more specifically, it is directed to a machine and codes marked by a machine such as by tattooing, both machine-readable and human-readable identification codes on an animal, such as tattooing a combination of alphanumerics and a barcode on the tail of a rodent.

BACKGROUND

Vivariums house a number of animals, typically test animals, such as mice, in a number of cages, often a large number. The test animals are frequently used to test drugs, genetics, animal strains, husbandry experiments, methods of treatment, procedures, diagnostics, and the like. We refer to all such uses of a vivarium as a study.

The animals in a vivarium must be observed, either manually by humans or by automated means, such as by the use of video cameras and video analytics software. Comparisons of animals are the basis of any study result.

There are a large number of animal characteristics, attributes, or behavior that may be of interest in a study. We refer to all such observable aspects of animals as "behaviors," including blood, saliva, feces, urine, breath, and fur attributes. Observations of behaviors may be manual or automated and may be invasive or non-invasive. They may occur in the animal's home cage; or in a separate observation or test cage or apparatus; or via pathology or other chemical, biological or analytical analysis. Observations and results may use statistics or aggregated behaviors.

For observing all such behaviors, it is critical that the observed behaviors be reliably, easily, and quickly linked to one particular animal. It is also necessary that marking the animals be consistent, fast, reliable and low cost. Prior art uses a variety of animal identification systems, including one animal per cage, ear notches, ear tags, foot and toe pad tattooing, embedded RFID, attached RFID, body tattoos, and tail tattoos. Some prior art uses human-readable markings, such as ear notches or ID numbers tattooed on a tail. Some prior art uses machine-readable markings, such as RFIDs, ear-tag barcodes, and tail barcodes. Some prior art comprises manual tattooing a rodent tail.

In an ideal world, each animal might receive a globally unique ID that is never re-used. However, that requires a large code space, which in return requires complex markings. In prior art practice, markings are often in a very small code space and other systems are used to uniquely identify an animal. One such prior art method is a marking that is unique only within a single cage. For example, colored ear tags may be used, with only five colors available. Alternatively, ear notches may be used providing a code space size of less than 100. Another prior art method uses unique markings within a single study. Animals in one study are generally kept well apart from animals in another study; thus, unique marking within one study may be sufficient.

All such prior art has significant weaknesses. For machine-readable markings weaknesses include:
not human-readable'
slow reading
requires specialized equipment
expensive equipment and expensive to read
computer required to read and map animal ID
may have single-vendor lock-in
two hands often required to use equipment
accuracy and reliability may not be computable or traceable
slow and expensive to mark animals
limited through rate for marking new animals
animals may have to be a minimum age to mark
may work only in-cage or may work only out-of-cage
either applying marks or reading marks may not be sterile
animal may have to anesthetized to be marked.
For human-readable markings weaknesses include:
often not machine-readable
may not be readable in the dark—the animals' natural activity period
reading may be unreliable
typically has a small code space
requires manual data entry to link animal ID to stored data
likely not suitable for machine marking
high labor cost for marking
accuracy and reliability may not be computable or traceable
limited through rate for marking new animals
slow through rate for marking new animals.
Embodiments of this invention overcome many of the weaknesses of prior art.

SUMMARY OF THE INVENTION

We use the term "animal code" for one or more codes that are placed on the animal. They consist of symbols from a symbol set, where the total of all combinations of symbols from the symbol set, as placed on the animal, is the size of the code space.

We use the term "animal ID" as a unique ID for an animal within a study or within another scope. There may be a mapping from the animal code that is marked on the animal to the animal ID.

Embodiments of this invention include machines for marking codes on an animal using a code combination comprising both a machine-readable portion and a human-readable portion.

Embodiments of this invention include machines for marking codes wherein the codes consist only of symbols comprised of straight line segments all of which are parallel or orthogonal to each other (except for deletion marks).

Embodiments of this invention include machines that move a tattooing head, or other marking head in one axis aligned with a rodent tail, and finger(s) that roll the rodent tail to accomplish orthogonal motion at the marking tip. Additional motions provide by the machine include and up/down motion at the marking tip and an optional release of the finger(s).

Embodiments include a table for the rodent, a valley or groove for the rodent tail, and optional disposable sanitation sheets, which may be placed under the rodent, or under the rodent tail, adapted to fit in the valley.

Embodiments of this invention include methods of using the machine to mark codes via tattooing on a rodent tail.

Embodiments of this invention include marking a code that comprises a human-readable portion that is also machine-readable.

Embodiments of this invention include marking a code that comprises a machine-readable portion that is a vine code. A particular vine code is described below.

The human-readable portion of a marked code is, in one embodiment, one or more alphanumeric characters from a reduced set of alphanumeric characters where the reduced set has the attributes of (i) symbols that are easily mistaken for a different symbol are deleted from the symbol set; (ii) all symbols may be drawn and easily read using only orthogonal, linear line segments.

In one embodiment, the code space size of the marked human-readable portion is appropriate to provide a unique code for each animal in a study, assuming the largest reasonable study size.

In one embodiment, the human-readable portion of the marked animal code is an index that maps to a sparse index table, wherein the index table provides a unique animal ID for animals within one study. Indexes may be re-usable in other parallel or future studies. This mapping table is part of an embodiment.

In one embodiment, the machine-readable portion of the marked code provides a unique study ID. In one embodiment the machine-readable portion of the code is an index that maps to a sparse study ID index table. This mapping table is part of an embodiment In one embodiment, error detection of the marking human-readable portion of the animal code is provided by using the parse animal ID index table, wherein the table is sparse, and wherein an animal code that does not map to a valid animal ID is detected as a read error in the animal code.

In one embodiment, error detection of the marked machine-readable portion of the animal code is provided by using the study ID index table, wherein the table is sparse, and wherein a machine-readable portion that does not map to a valid study ID is detected as a read error for the machine-readable portion of the animal code.

In one embodiment the machine-readable portion of the marked animal code must map to a valid study ID and, in addition, the human-readable portion of the animal code must map to a valid animal ID table in the animal ID index table for the valid study ID. In this way the mapping of both the machine-readable portion and the human-readable portion must properly map within sparse tables for a read to be valid.

Note that there is no specific requirement, in some embodiments, for the marked human-readable portion to be specifically associated with an animal ID within one study, and there is no specific requirement that the machine-readable portion be specifically associated with a study ID. For example, in one embodiment, the combined marked machine-readable and the human-readable portions may be viewed as a single animal code into a larger, sparse table that provides both a study ID and an animal ID, for that animal code. The marked human-readable portion might also be unique within a study, or other scope, such that the marked human-readable portion is sufficient to identify an animal within a vivarium application. Combining the marked human-readable portion with the machine-readable portion provides a far larger potential code space, making the corresponding index table much sparser, increasing the change that a misread of the entire code will be caught.

Animal codes portions, for either portion of the animal code, may be assigned randomly, pseudo-randomly, or by the use of other assignment algorithms. A key goal of any such assignment algorithm is that likely or random misreads have a high, or equal, probability of being caught. Such mapping algorithms are well known in the art. Ideally, animal codes, animal IDs, study codes and study IDs are distributed in an apparent arbitrary or random throughout the available corresponding code spaces.

One embodiment uses a vine code for the marked machine-readable portion. By vine code we mean a code using a sequence of parallel lines segments of varying length, and optionally a variable offset from a perpendicular read axis. This class of codes is well known including such standard codes as PostBar, POSTNET and RM4SCC. Machine-readable codes include barcodes, 2D (or matrix) codes, OCR, and many others. Traditional barcodes generally vary either the width of the bar or the spacing between the bars (or both) for encoding. 2D (or matrix) codes typically have a 2D grid or arrangement of cells wherein each cell is on or off, such as black or white. In the case of vine codes, neither the width of the bar nor the spacing between bars changes. Barcode terminology varies greatly. Therefore it is necessary to construe terms associated with barcodes in the context in which they are used.

There are a large number of proposed, previously used, and currently used machine-readable codes. Most of these were created to meet the needs of a particular application, such as postal codes on envelopes or fruit codes on oval fruit stickers. Embodiments of this invention include codes optimized for the application of this invention: machine-readable codes on rodent tails.

One embodiment comprises a vine code with a spine. The spine is a line along the read axis; that is, perpendicular to the parallel line segment. For convenience we normally think of spines as horizontal, such that orthogonal bars, or leaves, may have elements identified as ascenders or descenders. PostBar, POSTNET and RM4SCC do not use an explicit spine. These codes were designed for use on envelopes, for example, that do not significantly distort. Prior art vine codes use a variety of encodings, often have special segments within a printed code that are encoded differently, may or may not use "start" and "stop" codes, may or may not use parity, and may or may not use error-correction elements. Prior art vine codes are not configured to support printing or reading on curves. Prior art vine codes do not have an ability to mark out or delete a leaf, or to add a replacement leaf.

Rodent tails are very flexible and reading a code on a rodent tail must deal with the tail being straight or significantly curved. In addition, the tail may be rotated so that the "center" of the parallel line segments, or the reference axis or reference line, is hard to determine. Thus, for the particular application of this invention, a visible spine permits video analytics (or other machine vision) to track the tail curvature, rotation and position, and thereby reliably read the leaf locations, positions, and length reliably.

For convenience we refer to each line segment or bar as a "leaf." There may or may not be a starting or an ending leaf. In one embodiment a leaf that is longer than an otherwise valid leaf length is specifically reserved to mark that leaf as "deleted." In some embodiments a replacement leaf may be provided either following the deleted leaf, or at the end of the vine code, or in another location.

In one embodiment, each leaf (if not deleted) encodes two bits. The leaf segments may be ascenders, descenders, full height, or missing. In addition, an extra long leaf may denote a "deleted" leaf.

Note that it is desirable, and used in some embodiments, to use a hash or another "randomization" one-to-one transformation to create pseudo-random bit streams or high-entropy bits streams within the vine code so that there is an unlikely chance of a long string of "zeroes" which might be encoded as a missing leaf. Another method of preventing this situation is simply not use any such animal codes. Since they are indexes, there is no loss of arbitrary animal IDs or study IDS, up to the codes space size available. Yet another method is the use of several well know line codes or run length limited (RLL) code maps, such as 5b/6b, 8b/10b, RLL (2,7) or RLL (1,7) that assure a maximum run-length of either consecutive zeros or ones. Alternatively, a convolution code may be used.

For the human-readable portion, it is desirable to have code symbols that can be easily and reliably marked, such as by tattooing. Also, the symbols should be able to be quickly and reliably read by humans. In one embodiment, all such symbols are created from seven connected line segments, where each segment is present or absent, the segments are all parallel or perpendicular to each other, and the seven segments, if all present form the digit, "8." Such a format is well known in the art as a "seven-segment display." Such displays do a good job of presenting human-readable digits 0 through 9. However, displaying the complete roman capital letter alphabet (A through Z) in such a display requires mapping some letters to unconventional forms. We refer generally to this encoding per character as "seven segment."

Therefore, for one embodiment, a reduced alphanumeric symbol set is used. This set is created by starting with a 36-symbol set of ten digits plus 26 letters, then deleting all symbols that either (i) look like another symbol in the set, or (ii) cannot be readily mapped to an easily recognizable capital letter in the "seven segment" format. One such character set uses the characters shown in FIG. 5B. Alternative character sets created by the same or similar rules, for the same purpose, are specifically claimed under the Rule of Equivalents. This includes, for example, the addition of symbols or lower-case letters. This includes, for example, deletion of d, n, r, or T.

Embodiments of this invention includes machines that print codes consisting of symbols that consist of straight-line segments that are either aligned with the rodent tail axis or perpendicular (orthogonal) to it. Marking such symbols requires that only axis of motion move at one time. Some symbols of deletion are exceptions to the above restriction. These embodiments provides simpler, and thus lower cost, faster, and more reliable machine, and marks codes that are easier to read, easier to memorize, and more reliable.

A particular advantage of the embodiments and the codes that it may mark is the compatibility of the codes for use by human marking. In practice, within a vivarium it is important to use an animal marking system, codes and symbology that may be marked effectively by both humans and a machine.

A simple robot, or machine of various embodiments is described in detail below, which is suitable for automatic marking of the described codes on a rodent tail.

DETAILED DESCRIPTION OF THE INVENTION

Prior art barcodes use one code or marking to identify an object. Most often, the barcode is essentially a font or encodes a number, including a binary number. The characters encoded by the font or the number encoded is then the object identifier. Within some context or scope, that identifier is hopefully unique. Prior art barcodes generally assume reliable printing or marking, with some codes allowing for read errors by means of check digits or characters, parity, CRC, checksums, hash values, or forward error correction. Prior art also assumes a uniform or consistent surface on which the barcode is printed or placed.

Animal ID, particularly for animals in a vivarium, including but not limited to rodents, have several unique requirements.

First, marking may not be reliable. In fact, if marking is accomplished by tattooing then marking errors may occur more frequently than reading errors. Thus, it is desirable to have a code that allows for correction of mismarked code symbols.

Second, not only is there limited space on which to place animal IDs, particularly on a rodent tail, but also the idealized codes space is large: being ideally globally unique codes for all animals for all time. These two conditions are in direct conflict, as a large code space requires a physically larger code as marked, for a given resolution and desired reliability.

Third, accuracy of reading animal ID is critical in a vivarium. A single misread ID may invalidate a study or call into question the validity of a study. Thus, not only should reads be valid, but also error rates should be computable so as to provide a credible confidence level for both ID reads and study results.

Fourth, there is typically a requirement for an animal code to be both human-readable and machine-readable. While such a requirement exists in many other barcode applications and is solved by simply replicated the data once as a machine-readable barcode and again as human-readable text, the space for marking animal ID is extremely limited and thus this space-inefficient solution is not practical.

Fifth, the human-readable code should be one that is quickly and easily memorized by a human handler, who may well have both hands full and thus is not able to readily copy a read animal code onto paper or a keyboard. This requirement indicates a short code should be used, using symbology that is easy for people to memorize quickly and reliably. However, a short code is in direct conflict with desire to support a large code space.

Sixth, a rodent tail is long and thin. Therefore, at least for the machine-readable code, a symbology that uses short-height symbols is desirable. While prior art barcodes, as parallel lines, support short symbols, prior art barcodes are inadequate as explained herein.

Seventh, a common method of marking rodent tails is by use of tattoo. Tattoo heads mark points or lines at effectively a fixed width. Prior art barcodes typically use variable line width a part of the code. Such variable width lines are not compatible with standard tattoo heads.

Eight, rodent tails are live and change length as the animal grows, and in addition, both grow unevenly and support significant live curvature that may rapidly vary in shape. Prior art barcodes typically use variable line spacing as part of the code. Such variable width line spacing is not compatible with realities of changing tail length, curvature and space due to growth and live animal activity.

Ninth, controlling a tattooing head, with respect to a rodent tail, is difficult for both manual and automated operation. Therefore, the symbology used must mitigate these practical limitations. In particular, short line segments and diagonal lines are less reliably formed than perpendicular lines and line segments in one of a small number of fixed lengths.

Tenth, because rodent tails changes shape rapidly, it is desirable to have a symbology that inherently provides local curvature information. Although humans are excellent at reading text on curves, automated systems are not. Prior art barcodes do not support dynamically curving substrates.

Eleven, the width (diameter) of a rodent tale tapers from somewhat wide near the animal to narrow near the tip of the tale. Because of the very limited area in which to mark a rodent tale, it is desirable to have a code that takes advantage of the "tapered aspect ratio" of the rodent tail. Prior art barcodes assume a consistent, rectangular aspect ratio of the available substrate area.

Twelfth, it is critical in vivarium applications that reading animal IDs is both highly reliable and that reliability (error rate) is computable. Some prior art uses "check digits" to catch errors. However, check digits are very inefficient. For example, a single check digit, assuming uniform and random errors, catches only 90% of errors, leaving a 10% uncaught error rate. To get a 0.1% (one out of one thousand) error rate it is necessary to use three check digits. If the animal code is three digits to start with, then the use of check digits doubles the necessary animal area. Some codes use error correction, such as parity or Reed-Solomon codes. Such error correction is most efficient for longer data blocks. The short data blocks of the animal ID do not support efficient error correction. For example, a 20-bit animal code would typically require another 14 bits for Reed-Solomon bits. Therefore, forward error correction is not an effective means to detect read errors.

Thirteenth, many prior art methods of marking animals, including rodents, requires anesthetizing the animal prior to marking. Such anesthetizing is slow, expensive, stresses the animals, and requires specialized equipment. Placement of RFIDs or marking areas other than the tail typically requires anesthetizing. Some prior art marking methods, such as notching ears or punching in ear tags is painful for the animal and stresses the animal.

Fourteenth, it is desirable to minimize the cost of marking each animal; minimize the need for specialized equipment; minimize reliance on a single vendor for equipment or supplies; minimize the need for specialized training of the humans doing the marking; and provide for high throughput of marking new animals. Prior art methods generally are time consuming to mark, making them costly; or use specialized equipment or vendor-lock-in equipment or supplies (including ink cartridges or pre-manufactured ear tags); or are difficult to perform, requiring specialize training, which also limits the number of personnel available for marking and also limits throughput. Specialized equipment may also limit throughput.

Fifteenth, because it is desirable to keep code size at a minimum subject to all other requirements, it is desirable to be able to "re-use" animal codes, even if full animal IDs' are not reused. Prior art barcodes, being effectively fonts, do not permit effective index tables (such as in a database) that may be updated to permit re-use of animal codes. Note that we distinguish between the "animal code," which is marked on the animal, and the "animal ID," which is the ID associated with the animal for data recording and is unique within the scope of that animal ID. A table may be used to convert the animal code to the animal ID, where the index into the table is the animal code and the entry at that line of the table is the animal ID, as well as optional other data about either the animal code or the animal ID, or other related data. For this use, the animal code may also be called a "token," and the table called a "token table."

Sixteenth, it is desirable to integrate the animal management, including marking and reading, with computer data about the animals, studies and vivarium. Prior art barcodes, being simple font representations of predetermined text strings or numbers, have no inherent integration. In addition, such integration is typically always required in a vivarium. Prior art codes do not take advantage of such integration to implement the desired features of animal making and animal codes, as described herein, or to mitigate weaknesses, as described herein. Therefore, it is desirable to take advantage of computer integration and computer databases as part of the animal marking and animal ID system.

Seventeenth, prior art animal marking codes and methods often use small or extremely small code spaces. The minimum code space is marking uniquely each animal in one cage. For this purpose, sometimes colors are used. Five colors limit the number of animals in a cage to five. In addition, colors are typically not easily machine-readable. In particular, they cannot be read in infrared light, meaning they cannot be read during the normal nocturnal activity period of mice. Ear notches might have a code space of about 20, which is adequate for one cage. However, ear notches hurt the animals, and are also subject to a large human error rate as some notches may not be seen, or the ears may become damaged, or a human reader may mix up the two ears. Ear notches are very difficult to machine-read.

Eighteenth, it is desirable to be able to have a human-readable code available to a human if both of the human's hands are full. This means that the need to hold a barcode reader to read a mouse ID is undesirable. In addition, the need for a barcode reader for every mouse interaction is time-consuming and requires a large amount of expensive, specialized equipment.

Nineteenth, barcoded ear tags are undesirable because (i) they are expensive; (ii) they have single-vendor lock-in; (iii) they may not be available with the codes desired; (iv) they are not directly human-readable; (v) they require both operator hands to use (one to hold the mouse and one to hold the reader); (vi) they typically require the operation to be online to a computer in order to read the mouse ID. Paper and pencil may not be substituted, even temporarily; (vii) they may not be tolerated by the mouse; (viii) they may be chewed by other mice; (ix) relatively small amounts of detritus, such as food or blood, will make the code unreadable; (x) the animal will not do any self-cleaning of the ear tag. (However, they will self-clean their own tails.)

Twentieth, and of particular importance, animal IDs in a vivarium are typically needed in two separate scopes: first within one study and second within the entire vivarium. A scope of a single cage is poor for several reasons. One is that the cage number must be used in order to make the mouse ID unique within a study. This introduces several sources of errors and also makes cage swapping, or moving mice between cages both cumbersome and error prone, as the indexing system must be properly and timely updated. It also means that mice from more than one cage cannot be intermixed. If they are accidentally intermixed, all those mice must be removed from the study immediately. Therefore, it is strongly desirable that a mouse ID be unique within a single study. Study sizes may vary from about five mice up to many hundreds. Therefore, a codes space of at least five hundred is typically necessary for animal ID within a study. Animals from different studies are almost never intermixed. Often the cages for one study are physically segregated from cages used in another study. Therefore, often knowing only the animal ID unique for one study is adequate for a large percent of animal handling and animal ID activities. It is advantageous to have the animal code unique to a study to be human-readable, as this meets many of the above numbered requirements or desires.

With regards to the scope being the entire vivarium, it is necessary at various times and locations to assure than animals from one study are unquestionably part of that study, and that study animals are not intermixed, and that the absolute identity of every animal within a vivarium, or within a group of vivariums which might ever move or share animals, be known without risk of error, or with an extremely small and computable error. Thus, animals need to be permanently marked in some way with a code space equal to the maximum possible number of animals in a vivarium, and in addition provide some means of validating valid reads of this animal code. Such a code space is in the range of 100,000 to one million, and might even be larger in some applications.

Novelty

A novelty of embodiments is to use both a human-readable code portion and a machine-readable code portion. In one embodiment these two portions use different codes. In one embodiment, these animal code portions are marked on an animal's tail, such as a rodent tail. In one embodiment the animal code portions are tattooed. The tattooing may be manual or automated.

Figure 1:
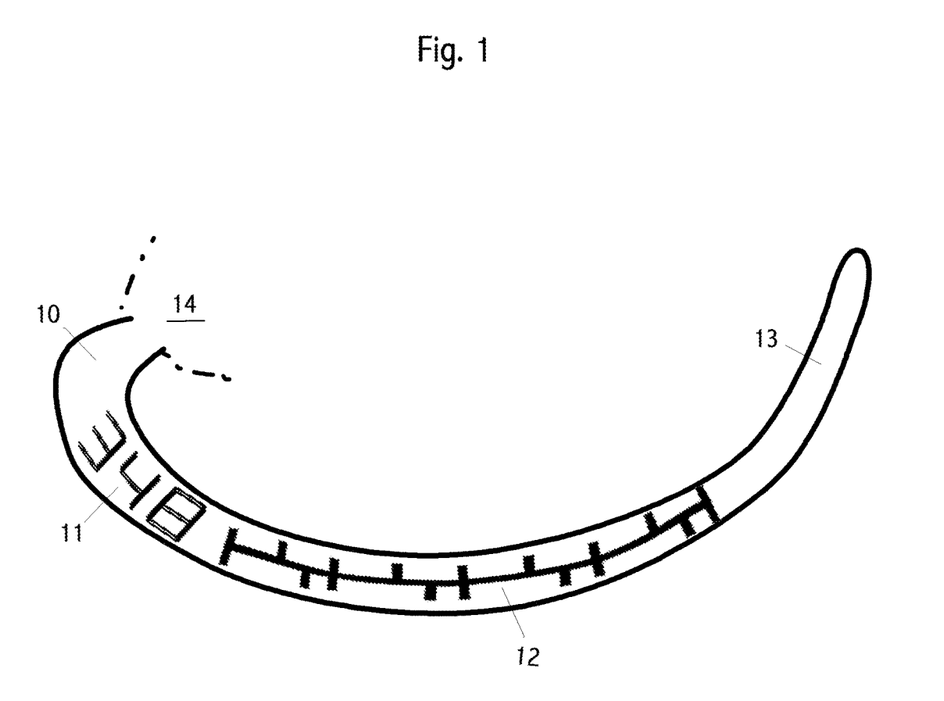
FIG. 1 shows a rodent tail with a combined code tattooed.

FIG. 1 shows an exemplary human-readable code portion 11 and an exemplary machine-readable code portion 12 on a rodent tail 13. 10 is the body end of the tail; 13 is the tip end of the tail. 14 shows a partial rodent body In some embodiments the human-readable code portion is also machine-readable.

In some embodiments, the human-readable code portion is unique within one current study, however, such a limitation is not a requirement for all embodiments.

In some embodiments, the machine-readable code portion is unique for all animals in a vivarium, or for all currently live animals in a vivarium. In some embodiments, the combination of the human-readable code portion and the machine-readable code portion is unique for all animals in a vivarium, or for all currently live animals in a vivarium. For example, the machine-readable code portion may map to a study ID.

Figure 6:
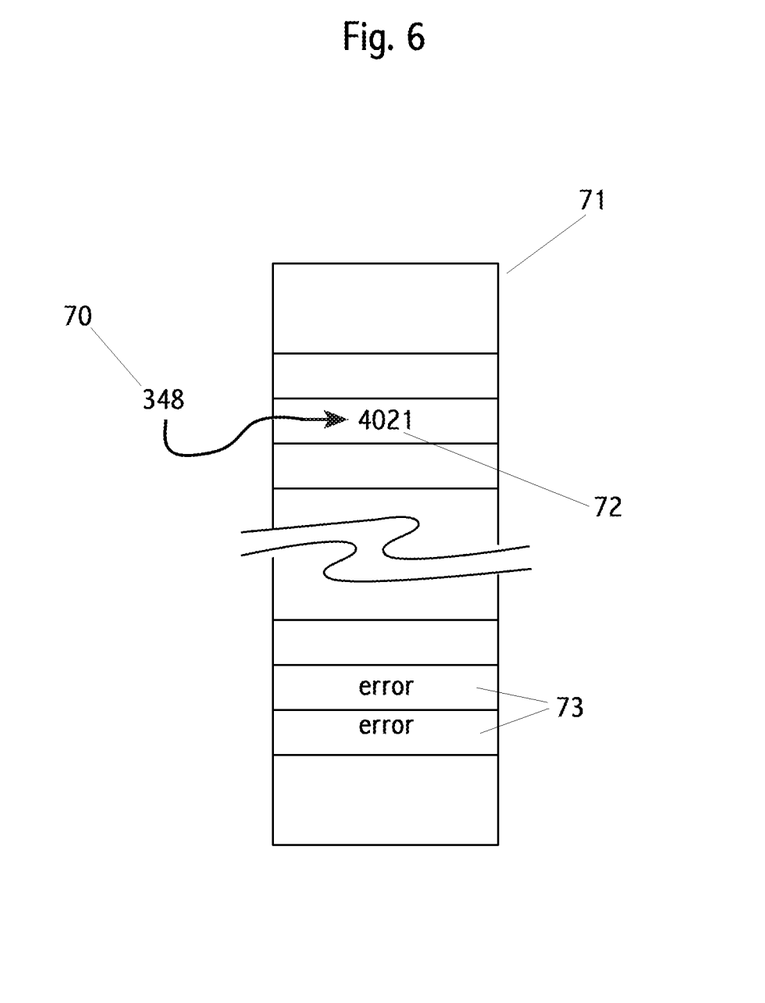
FIG. 6 shows a sparse index table.

In some embodiments an animal code, the data marked on the animal, is mapped via a mapping table to the animal ID. Such a mapping table is shown in FIG. 6. This may be true for just the human-readable portion, or just the machine-readable portion, or both. One advantage of this is that animal codes may be reused, while keeping the animal IDs unique, at least within a known scope, context, and time period. For such embodiments, the animal code may be called or thought of as a "token." The animal code, or token, is then used as (or is) an index into one or more mapping tables. One such map type is a "through map" meaning that some or all of the table lines comprise data that is the same as the index for that line. In these cases the code is then the same as the corresponding ID.

Continuing with FIG. 1, we see both a human-readable code portion 11 and a machine-readable code portion 12 marked on a rodent tail. 13 The rodent may be a mouse. The method of marking may be tattooing. The human-readable code 11 may comprise an alphanumeric character set comprising digits and Roman letters. The human-readable code may comprise digits, as shown 11 in this Figure. The human-readable code 11 may comprise an alphanumeric character set comprising digits and limited Roman letters such that the remaining Roman letters in the character set are easily recognizable and clearly distinguishable from digits or other Roman characters. The human-readable code portion may be one character, two characters, three characters, four characters, or five characters, or the range of 1-2, 1-3, 1-4, 2-3, 2-4, or 3-4 characters. Alternative embodiments use numeric only or alpha only, including foreign languages, for the symbol set of the human-readable portions. Such embodiments are specifically claimed. Such symbol sets are not as space efficient, with respect to tail area, as alphanumeric. Also, they may be harder to memorize and produce a higher read error rate.

The human-readable code portion 11 may code an animal ID, unique within a known scope. The human-readable code portion 11 may code an animal ID, unique within one animal study. The human-readable code portion 11 may be a first animal code, where the first animal code must be looked up in a first animal code-mapping table whose entries comprise the corresponding animal ID.

Continuing with FIG. 1, the machine-readable code portion 12 may be a vine code, with or without a spine. It may be a barcode known in the art. The spine is aligned with the tail such that the code is easy to read with machine vision, as the spine clearly demarks the location and curvature of the tail, and also provides a reference point for determining if the bars, (or "leaves") in the code are ascenders, descenders, full-height or missing. A rodent tail may not only curve dynamically with rodent activity, but also rotate around the tail axis. The tail may also curve upward. Thus, a code spine is valuable to determine all such distortions from an ideal, flat, rectangular, fixed substrate for the code marking. In addition, the tail may be partially covered with detritus, such as bedding or other material. A continuous spine makes if far easier to determine reliably if a portion of the machine-readable code is so obscured.

Prior art required white or black cage bottoms to machine-read a tail barcode. Prior art required cages to be free for bedding, as that might obscure a portion of the code, causing a misread. Use of a vine code with a spine eliminates these requirements as the dark markings on a light tail provide sufficient contrast, and use of a spine does not require that the edges of the tail be identifiable.

In some embodiments the machine-readable code portion 12 is an animal identifier within a known scope. In some embodiments the scope is all the animals in a vivarium. In some embodiments the scope is all the live animals in a vivarium. In some embodiments the scope is all the animals in a group of vivariums.

The machine-readable code portion 12 may be a second animal code, where the second animal code must be looked up in a second animal code-mapping table whose entries comprise the corresponding animal ID. The machine-readable code may be a second animal code, where the second animal code must be looked up in a second animal code-mapping table whose entries comprise a corresponding study ID.

In some embodiments the combination of the human-readable and the machine-readable code portions is an animal identifier within a known scope. In some embodiments this scope is all the animals in a vivarium. In some embodiments the scope is all the live animals in a vivarium. In some embodiments the scope is all the animals in a group of vivariums. In some embodiments the scope is all the live animals of all vivariums. In some embodiments the scope is all the animals of all vivariums.

The combination of the human-readable and the machine-readable code portions may be a third animal code, where the third animal code must be looked up in a third animal code mapping table whose entries comprise the corresponding animal ID.

The code space of the machine-readable code portion may be no more than 10,000; 100,000; 1,000,000; 10,000,000; or 100,000,000. The code space of the machine-readable code portion may be no more than 12 bits, 14 bits, 16 bits, 18 bits, 20 bits, 22 bits 24 bits, 26 bits, or 28 bits. The code space of the machine-readable code portion may in the range of 12-14 bits, 12-16 bits, 14-18 bits, 16-20 bits, 18-22 bits, 20-24 bits, or 22-28 bits, 14-20 bits, or 16-28 bits. The machine-readable code portion may or may not comprise check bits, parity bits, checksums, CRC, and forward error correction.

Figure 2:
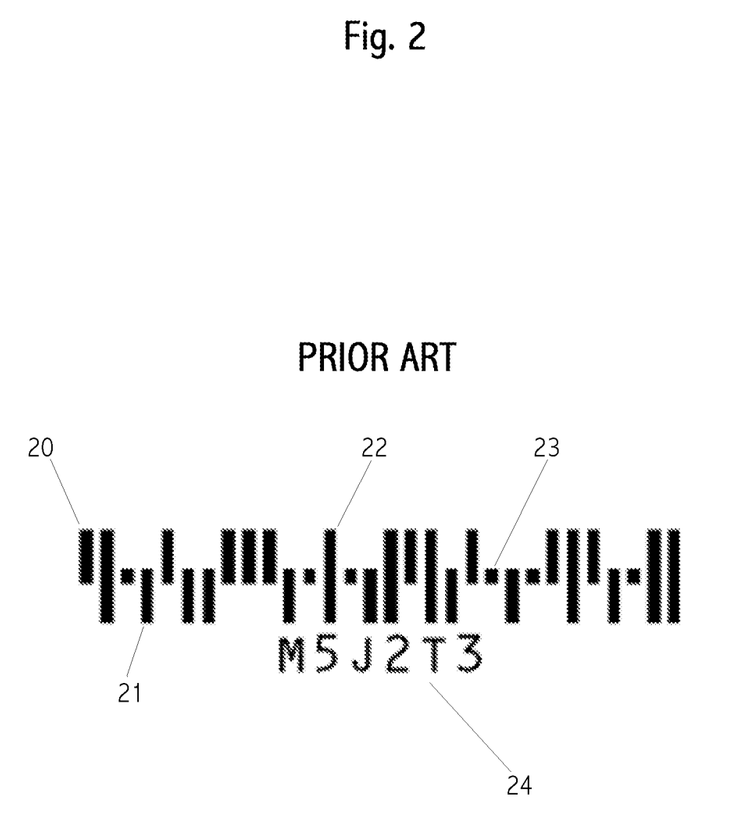
FIG. 2 shows a prior art machine-readable vine code.

Turning now to FIG. 2 we exemplary prior art. There is no visible spine. An ascender bar or leaf is shown 10. A descender leaf is shown 21. A full-height leaf is shown 22. A minimal leaf is shown 23. The machine-readable code in this Figure is made human-readable by replicating the data in the code as text, 24.

FIG. 2 shows prior art vine code. This is an example of one of a number of postal code symbologies. Prior art vine code symbologies did not have a marked spine. Prior art vine code symbologies have no provision for marking a bar as deleted, and have no provision for adding a replacement bar for a deleted bar. Prior art vine code symbologies use pre-determined encodings and do not use a dynamic lookup table to map from a printed code to an effective identifier of the object (or substrate) on which the code is printed.

Figure 3:
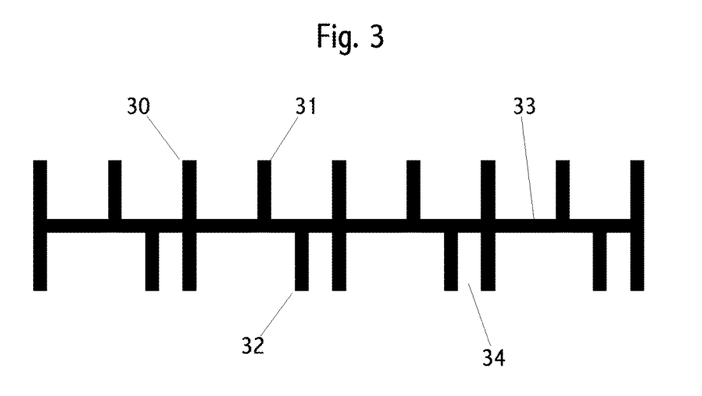
FIG. 3 shows an exemplary vine code with a spine.

Turning now to FIG. 3, we see an exemplary vine code of one embodiment. 30 is a full-height leaf. 31 is an ascender leaf. 32 is a descender leaf. Location 33 shows a missing leaf. 34 shows a fixed-width gap between leaves. Missing leaves, such as 33, are detected by noticing that the gap between adjacent leaves is twice the fixed-width gap 34 plus the width of one bar. Note that the prior art code in FIG. 2 does not have missing leaves, but rather minimum height leaves.

In some embodiments, the leaves (or bars) of the vine code may encode two bits each. In some embodiments, two bits may be encoded as one of: (i) an ascending leaf 31; (ii) a descending leaf 32; (iii) a full-height leaf 30; (iv) a missing leaf 33. In some embodiments a leaf that is longer than a full-height leaf may be used to indicate a deleted leaf position. In this Figure, line width is not part of the coding. In this Figure, the spacing between leaves 34 is fixed: line spacing is not part of the coding. An advantage over prior art is that by ignoring both line width and line spacing in the coding, the significant real-time and growth-based dynamics of a rodent tail do not distort the marked code so as to reduce the reliability of reads or cause misreads. Even if any such misread rate is low, it is not accurately computable. In addition, both line width and line spacing are difficult to control when tattooing, whether the tattooing is done manually or by a robot.

An exemplary vine code, such as shown in FIG. 3, may encode 12-14 bits, 12-16 bits, 14-18 bits, 16-20 bits, 18-22 bits, 20-24 bits, or 22-28 bits, 14-20 bits, or 16-28 bits. The vine code may or may not comprise check bits, parity bits, checksums, CRC, and forward error correction.

Figure 4:
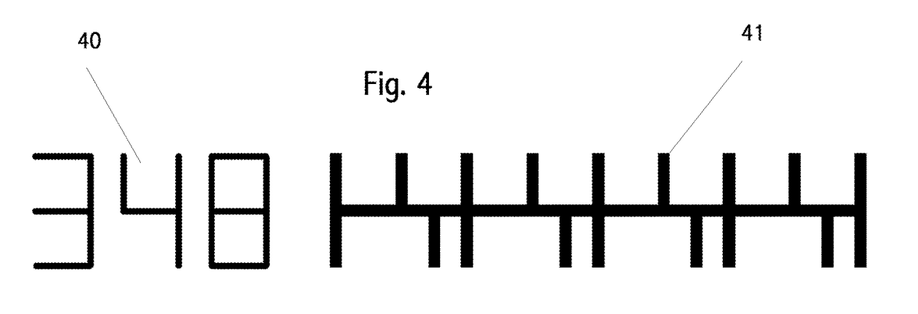
FIG. 4 shows combined machine-readable and human-readable code combination.

Turing now to FIG. 4, we see an exemplary combination of both a human-readable code portion 40 and a machine-readable code portion 41.

Figure 5A:
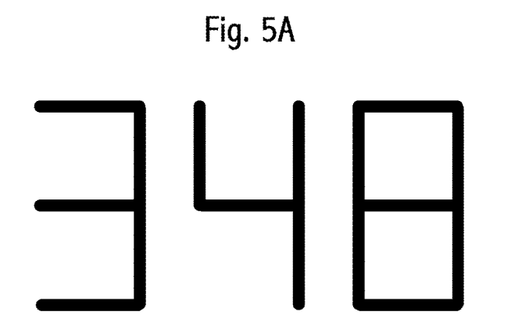
FIG. 5A shows an exemplary human-readable code.
Figure 5B:
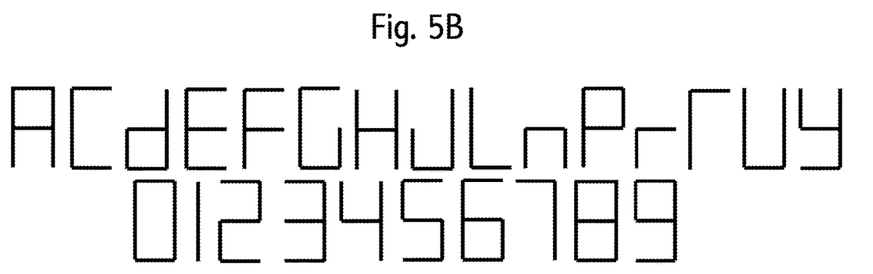
FIG. 5B shows an exemplary human-readable symbol set.

Turning now to FIGS. 5A and 5B, we see an exemplary symbology for the characters in a human-readable code. All characters may be formed by a non-empty subset of seven straight-line segments, arranged in a well-known "seven-segment" formation. The use of this formation is uniquely advantageous for tattooing rodent tails because each line segment may be formed by motion in only one axis. The motion may be manual or automated. Either the rodent (or the platform on which the rodent rests) may be moved, or the tattooing apparatus may be moved. In one embodiment, motion along the axis of the tail is implemented by supporting a tattooing head on a linear track, which in turn may be supported by a gantry or other support structure. In one embodiment, the other axis may be implemented by rotating the tail around the tail axis. For manual tattooing, such rotation may be via one or more finger(s) gently placed on the tail. For automatic tattooing, a motorized rubber finger or fingers may be used, effectively operating similar to manual operation. Tattooing movement in only one axis at a time is far easier for human operators, which is a unique problem, and for which this code symbology is a novel solution.

FIG. 5A shows an exemplary code, here the three characters "348," using the exemplary symbol set shown in FIG. 5B. Note that all symbols shown in FIG. 5B may be formed from a subset of the seven-segment line segments. Note that all symbols shown in FIG. 5B are readily identifiable without confusion with other symbols, and also readily memorized in codes.

The symbol set for the human-readable code may comprise an alphanumeric character set comprising digits and Roman letters such as shown in FIG. 5B. The human-readable code may comprise digits, as shown in FIG. 5A. The human-readable code may comprise an alphanumeric character set comprising digits and limited Roman letters such that the remaining Roman letters in the character set are easily recognizable and clearly distinguishable from digits or other Roman characters. The human-readable code portion may be one character, two characters, three characters, four characters, or five characters, or the range of 1-2, 1-3, 1-4, 2-3, 2-4, or 3-4 characters. One such reduced character set is shown in FIG. 5B. Here, the letters "D" and "N" are represented more closely to their traditional lower case appearance: "d" and "n" respectively. The letters T and Y appear asymmetric in the code; however, they are still easily identifiable by people. Within the context of our claims, we explicitly claim all similar reduced character sets, similarly reduced for readability in a seven-segment format, under the Rule of Equivalents.

Figure 5C:
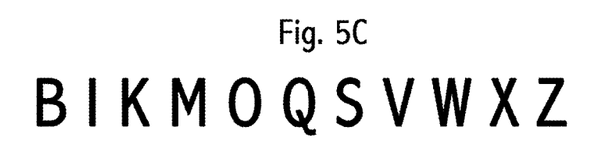
FIG. 5C shows an exemplary set of capital letters missing from a human-readable symbol set.

FIG. 5C shows Roman characters not used in the exemplary symbol set due to their similarity to other digits or characters.

Another embodiment uses the seven line-segment basis expanded to nine segments by the addition of two, three, or four diagonal segments in the upper and lower rectangles formed within the digit "8." The addition of these diagonal segments permits the full 36-character alphanumeric character set to be distinctly marked.

Turning now to FIG. 6, we see an exemplary embodiment of a mapping table. Such a table may be used only for mapping the human-readable code portion, or mapping only the machine-readable code portion, or two separate tables with one for each code portion, or a single unified code table that maps both code portions with one lookup in that table. The table is shown 71. An index, such as an animal code, is shown 70. Here the animal code is "348." This index points to table line 72. Here we see that this table line 72 comprises an animal ID of "4021." Table lines that do not have animal codes pointing to them comprise an error indicator, as shown for two table lines, 73.

A particular advantage, in some embodiments, of using one or more mapping tables, is that only currently valid animal ID are entered into the table. Any animal code properly read will then map to a valid animal ID. However, a misread of an animal code then has (an accurately computable) chance of mapping to a table line that does not contain a valid animal ID, but rather contains indication of error, that is, a misread. We refer to such a table entry as an error code. For example, if one study uses 15 animals, and the code space for the animal ID for animals within one study is 625, then random misreads will be caught (625-15)/625=97.6% of the time. This method of catching read errors does not require any additional marking space on the animal. It is desirable to assign the animal codes, or tokens, using some algorithm, such as pseudo-random assignment (or one of many other known algorithms, such as incrementing token numbers by a relatively prime), to cause misreads to be effectively random, which assures that such reliability computations are applicable. Ideally, both the codes and IDs are distributed throughout their corresponding code and ID spaces.

This method of detecting errors may also be used, in some embodiments, in the machine-readable code portion. For example, if the machine-readable code portion is 28 bits, providing a code space over 250 million, and the total vivarium population is 100,000, then random misreads will be caught (268,435,456-100,000)/(268,435,456)=99.96% of the time. In practice the error rate is likely better than this, because both the machine-readable portion and the human-readable portions must both map to valid table entries. Equivalently, if either the human-readable portion or the machine-readable portion generates an error, then both the human-readable portion and the machine-readable are questionable, even though one of them may in fact have been read correctly.

The table in FIG. 6 also demonstrates a study ID table using machine-readable codes as the index. For this interpretation of FIG. 6, the machine-readable code is shown as 70, and the study ID is "4021" in line 72.

There are three key purposes and benefits of such tables. First, by using a sparse table with respect to the number of valid animal IDs, a large fraction of read errors of the animal code will be caught because they map to table lines that contain an error code, rather than a valid animal ID. One such claim is explicitly such a sparse table and also one such claim is the use of the sparse table for misread detection. Second, the mapping table provides the ability to reuse animal IDs, treating them in one interpretation as re-usable "tokens." When an animal is no longer alive, or other wise cannot have its animal code read, that animal code may immediately be reassigned to another animal. Such reassignment is implemented by changing the data in the table line indexed by that animal code. This approach allows a smaller code space for the animal codes on the animals, while permitted a large code space for the animal IDs. It simultaneously permits most misreads to be caught without the space-consuming need for check characters on the animal. In addition, shorter character sequences are memorized by humans more reliably than longer character sequences, and are thus more reliable. The third benefit of the mapping tables is the inherent integration or ability to integrate with other animal, study, and vivarium data. Such data may be additional information in the table lines or otherwise in accessible databases indexed by either the animal code or the animal ID. Such integration provides faster and more reliable data entry and will typically catch errors so quickly as to permit immediate correction without damage to the study or increased costs, or less reliable study data. We specifically claim the use of the mapping tables to implement the processes, procedures, applications, and benefits as described herein.

Figure 7A:
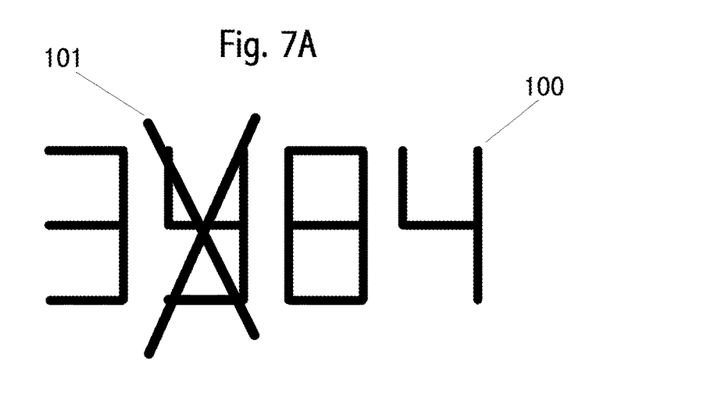
FIG. 7A shows a corrected error in a human-readable code.

Turning now to FIG. 7A we see one embodiment of correcting a marking error in a human-readable code. The correct code is "348." However, here the "4" in location 101 was marked incorrectly. The correction is made by placing a large "X," or another marking that is distinct from, or larger than, or both, the superposition of all other characters in the symbol set. Such a deletion indicator is shown as 101. Then, the correct deleted symbol is added at the end of the code, shown here at location 100. Note that this method may be used for more than one error symbol in a code. Locations other than at the end of the code may be used. However, at the end is preferable because the error may not be discovered until after the code is otherwise completed.

Figure 7B:
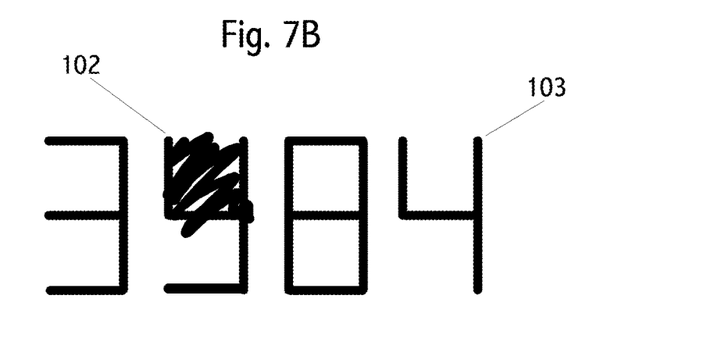
FIG. 7B shows an alternative corrected error in a human-readable code.

In FIG. 7B we see an alternative embodiment and method of correction. Here location 102 shows the location of the error. The deletion mark is a large black area. Here the deletion mark comprises markings not found in any symbol. The correct symbol is placed at the end of the code, shown here at location 103. The correct code is "348."

Figure 7C:
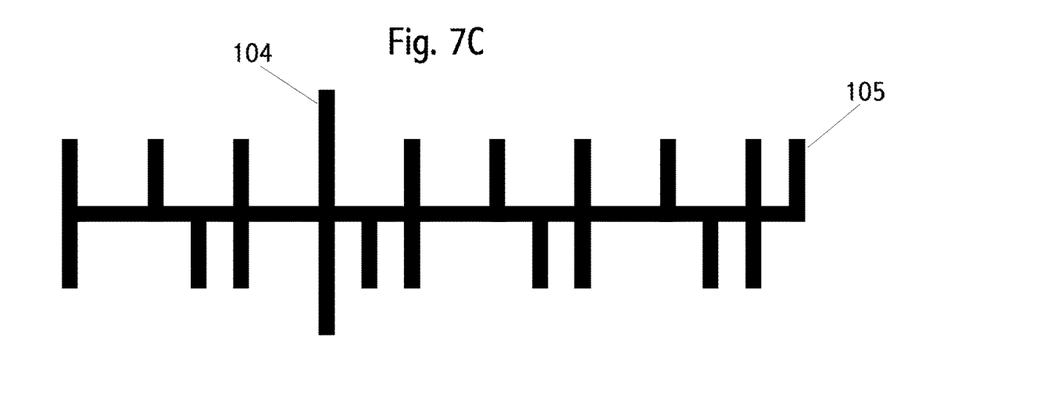
FIG. 7C shows a corrected error in a machine-readable code.

In FIG. 7C we see one embodiment of correcting a marking error in a machine-readable code. Location 104 shows an extra long leaf, or bar. This extra-long leaf will cover any leaf that is an ascender or descender. The correct leaf is then placed at the end of the code, here shown at location 105. More than one leaf in error may be corrected this way. For a leaf or leaves that are not at the correct spacing, such leaves are covered with the extra-long leaf, and also an extra-long leaf is placed at the nominal correct location or locations. Then, as before, the deleted leaves are placed at the end of the code.

For a machine-readable vine code as shown in FIG. 7C, an alternative embodiment for some marking errors is to assign the machine-readable code of the "as marked" code, to the same ID, such as a study ID, as the correct machine-readable code, by updating the machine-readable mapping table.

Figure 8:
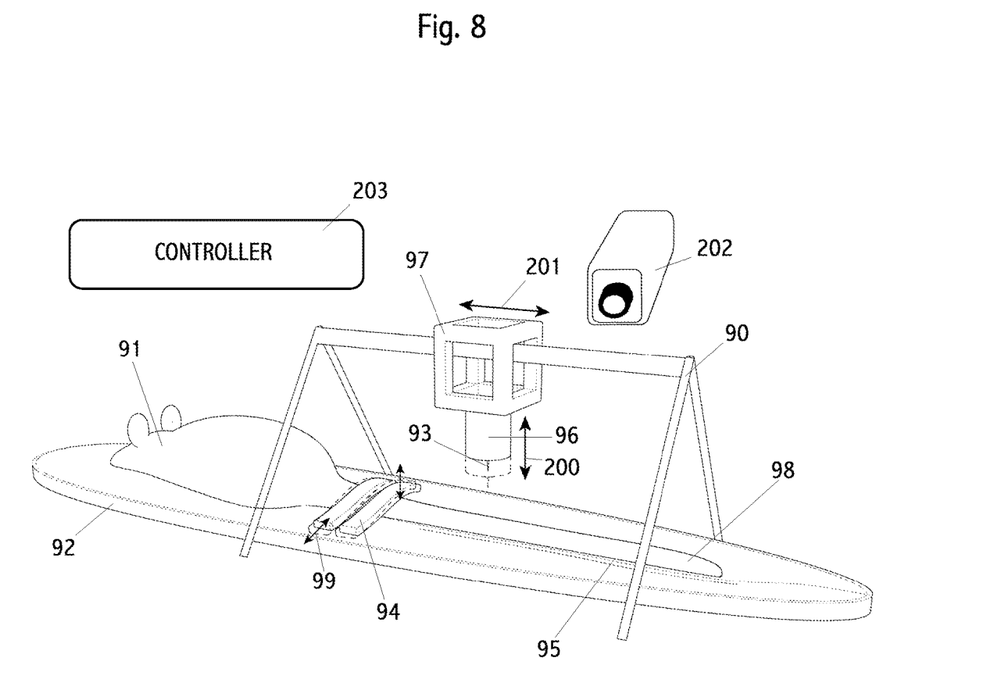
FIG. 8 shows an embodiment of an automated device of this invention.

In FIG. 8, we see an automatic machine suitable for marking the codes of this invention, or many other codes. It is particularly suitable for the codes described herein. 91 is a mouse, as an example of animals or rodents. The mouse may be restrained by a mouse-restraint, not shown. The mouse tail is 98. The mouse rests on a mouse table, 92. The mouse table 92 has an optional valley, groove or dip, 95. 93 shows the tip of a tattooing head, or tattoo gun, 96. The tattooing head is attached via a traveler 97 to the beam of a gantry 90. One or more movable finger(s) 99 hold the mouse tail 98 in position.

To mark the human-readable and machine readable codes described as embodiments herein, two directions of motion of the tattoo tip 93 relative to the mouse tail 98 are required. The first direction of motion is along the axis of the mouse tail, shown by arrow 201. This motion makes "horizontal" lines segments using code orientations shown in the other Figures. The second direction of motion is the rotation of the mouse tail 98 around its axis. This rotation is accomplished by a simple rolling motion of the tail, performed by moving the finger(s) 94 in the direction shown by the arrow 99. There may be one or more finger(s); two finger(s) are shown here. An alternative to finger(s) is one more capstans in contact with the tail. Yet another alternative is to move the mouse or the mouse table. This alternative may use a linear motion. The valley or groove 95 keeps the mouse tail straight, although in some embodiments this valley is not required. A tail clamp may be used. A key advantage of the symbologies of embodiments of this invention is that only one direction of motion is required at a time. This is ideal for both human tattoo operators and for the machine of this Figure.

The machine requires one additional motion. This is the raising and lowering of the tattoo tip, 93, relative to the mouse tail, 98. This motion is shown by arrow 200. This may be implemented using a solenoid, motor, or hydraulics. Either the tip 93 alone, or the tattoo head 96, or beam of the gantry 90 may be moved. Rotation may be used, rather than linear motion, because the distance the tattoo tip has to travel is small.

One additional motion may be automatic by the machine or may be manual. That is the raising and lower of the finger(s) 94 in order to place and remove the mouse. The finger(s) may be spring-loaded, have a two-position latch, slide in and out of finger holders. Many other implementations are possible, as those in the art know.

The machine may have additional motions. The mechanical design in this Figure is highly schematic, as those in the art appreciate. Finger(s) may move along the mouse tail, or more than one finger or set of finger(s) may be used.

Embodiments may move the mouse table, 92 in one or more motions in place of the motions described.

It is desirable in some embodiment, to be able to slide the traveler 97 along the gantry beam by hand in order to position the tattoo head 96 relative to the tail 98.

Motion 201 may be accomplished via stepper or servo motors and a belt, cable or chain, or by the use of driven screw, or a capstan or by hydraulics, or by other means, known in the art. Motion 99 may be accomplished by a solenoid, motor, or hydraulics, or other means, known in the art.

Both control of the operation of the machine of FIG. 8 and the verification of correctly marked codes may be performed by the use of a single video camera, 202 and a controller 203. Such use of a single camera for both purposes is claimed as an embodiment.

In some embodiments reading of the marked animal codes comprises tracking data that maintains either code metrics (e.g. code bar spacing, code bar spacing, and the like) or code-on-tail images, or both. As the marked codes shift slowly but significantly over time, the methods and data associated with the animals may use such regularly updated metrics or image data to improve code reading and identification. The video camera used in some embodiment provide a "starting point," that is, a "starting image" for such time-based tracking.

An alternative embodiment to traditionally tattooing is to damage, abrade or puncture the skin on the rodent tail either before after applying ink. Such action may be caused by an automatically controlee needle or knife, or a laser. In one embodiment the ink is applied manually, in bulk, either before or after damaging, abrading or puncturing the skin in the pattern to be marked on the tail.

An alternative embodiment to traditionally tattooing is using an ink jet printer print head to apply ink. The skin of the rodent tail may be damaged, abraded or punctured prior to applying the ink via the print head. One advantage of using an ink jet print head is the ability to easily use colored ink. Such an embodiment is specifically claimed. In one embodiment this color is used to identify a mouse within the scope of one cage. The color may be part of one of the code portions described herein, or may be an additional marking.

The human-readable code and its associated symbology, features and mapping table are claimed as embodiments independent of the machine-readable code.

The machine-readable code and its associated symbology, features and mapping table are claimed as embodiments independent of the human-readable code.

Additional Embodiments Include

A marking machine for marking a rodent tail comprising:
an animal support, adapted be raised and lowered;
a tattooing head;
a linear gantry supporting the tattooing head wherein the gantry is configured to allow the tattooing head to move along the gantry;
a tail roller, adapted to roll a rodent tail.

A marking machine for marking a rodent tail comprising:
an animal support, adapted be raised and lowered;
a tattooing head;
a linear track adapted to move an animal on the animal support on an axis aligned with the animal's tail.
a tail roller, adapted to roll the tail of an animal on the animal support.

Additional Embodiments

Embodiments of this invention explicitly include all combinations and sub-combinations of all features, elements and limitation of all claims. Embodiments of this invention explicitly include all combinations and sub-combinations of all features, elements, examples, embodiments, tables, values, ranges, and drawings in the specification and drawings. Embodiments of this invention explicitly include devices and systems to implement any combination of all methods described in the claims, specification and drawings.

Embodiments specifically include all independent claim limitations in all combinations with all independent claims.

Embodiments are claimed wherein the word "comprises" is replaced with the word, "consists," in one or more places in a claim.

Definitions

Communication—may be electromagnetic, optical or audio. Audio comprises sub-audio and ultrasonic audio.

Gantry—any support for a linear track, including the track itself, or an open support or closed support. May include a rectangular enclosure or a system adapted to be secured in an existing support structure (such as a bench or fume hood).

IR LED—An IR LED is one in which its spectrum peaks or is predominantly in the infrared spectrum, as normally defined with respect to IR LEDs and IR cameras. Note there may be some overlap between the "IR spectrum" and the "visible light spectrum."

Pathogen-free—means the population of microbes, including but not limited to bacteria, viruses, prions and toxins, relevant to the experiment, are sufficiently reduced to meet the needs of the study, or to not impact the health, performance or behavior of the target animal population or of the workers.

Primary cage or home cage—the cage in which an animal spends more time than any other cage. Of note, there is a related term of art: "home cage." The definition of primary cage is, in some embodiments, the home cage. An aspect of home cage/primary cage deals with the fungibility of the actual cage itself. Each time a cage is changed, the physical cage is generally either disposed of or removed for washing, and replaced by a clean cage. The new physical cage is considered the same primary cage. A primary cage may sometimes be distinguished from a non-primary cage by the purpose of the cage. For example, a home cage may be for living in, as compared to an experimental cage to which the animal is transferred that is equipped or located for one or more particular experiments for the applicable study.

The primary cage is different from special purpose, behavioral-measurement, behavioral-detection, or behavioral-observation cages that are generally used for only a short time for the duration of a particular test due to cost and mindset.

Sealed enclosure—an enclosure sealed against pathogens that impact or alter study results, or alter the credibility or repeatability of study results, entering or leaving the enclosure.

Sensor—may or may not include the use of local or remote processors, and may or may not include local or remote software executing on the local or remote processors. Sensors may or may not communicate over a network. Multiple sensors may or may not include common elements.

Set—one or more, unless stated otherwise.

Sparse table—an electronic table where not every table line contains an entry for the primary data either as an index or as table line data. However, otherwise empty or unused table lines may contain an indication of error.

Subset—one or more elements of a set, including all elements of the set, unless stated otherwise.

Sterile—pathogen-free.

Visible light—Free of visible light means the ambient light is sufficiently low and in a spectrum such that the animal's physiological state and behavior are consistent with its natural physiological state and behavior at night.

White light—Light with wavelengths across the visible spectrum that is suitable for seeing color using a conventional color camera, as conventionally defined in the art. Note that white light may include some wavelengths outside of the visible spectrum.

Ideal, Ideally, Optimum and Preferred—Use of the words, "ideal," "ideally," "optimum," "optimum," "should" and "preferred," when used in the context of describing this invention, refer specifically a best mode for one or more embodiments for one or more applications of this invention. Such best modes are non-limiting, and may not be the best mode for all embodiments, applications, or implementation technologies, as one trained in the art will appreciate.

May, Could, Option, Mode, Alternative and Feature—Use of the words, "may," "could," "can," "option," "optional," "mode," "alternative," "typical," "ideal," and "feature," when used in the context of describing this invention, refer specifically to various embodiments of this invention. Described benefits refer only to those embodiments that provide that benefit. All descriptions herein are non-limiting, as one trained in the art appreciates.

What is claimed is:

1. A method of marking a rodent tail comprising the steps:
   (a) marking on the rodent tail, with a marking-machine, a machine-readable code portion comprising a plurality of evenly spaced bars of varying length perpendicular to the longitudinal axis the rodent tail;
   (b) marking on the rodent tail, with the marking-machine, a human-readable code portion comprising a plurality of human-readable alphanumeric characters;
   wherein the machine-readable code portion and the human-readable code portion do not code the same data and the data coded by each is not as subset of the other data; and
   wherein the marking-machine comprises:
      a tattooing head, adapted be raised and lowered;
      a linear gantry supporting the tattooing head wherein the gantry is configured to allow the tattooing head to move along the gantry;
      a tail roller, which rolls the rodent tail around its longitudinal axis to mark the tail,
      wherein the machine-readable code portion of the mark comprises a continuous spine parallel to the longitudinal axis of the tail.

2. The method of claim 1 wherein:
the human readable code portion is unique within a set of all rodents in a single animal study.

3. The method of claim 1 wherein:
the machine-readable code portion is a study identifier unique within a set of all studies performed at a vivarium.

4. The method of claim 1 wherein:
the human-readable code portion comprises an alphanumeric character set of no more than 32 characters comprising 10 digits and 26 Roman alphabet letters minus at least four Roman alphabet letters.

5. The method of claim 1 wherein:
the human-readable code portion comprises an alphanumeric character set wherein each character in the set is formed from a subset of seven connected linear line segments, wherein each line segment is either parallel to or orthogonal to all other line segments.

6. The method of claim 1 wherein:
the machine-readable code portion comprises a visible spine parallel to the longitudinal axis of the rodent tail;
wherein each bar in the code portion is perpendicular to the visible spine and, if the bar is not missing, the bar is touching the spine; and
wherein the set of possible bars comprises (i) a descender, (ii) an ascender, (iii) a full height; (iv) a missing; and (v) an oversize; wherein:
   a descender bar is visible only on a first side of the spine;
   an ascender bar is visible only on a second side, opposite of the first side, of the spine;
   a full height bar is visible on both the first and second side of the spine;
   a missing bar is not visible or is negligibly visible;
   an oversize bar is longer than a full-height bar.

7. The method of claim 1 wherein:
the human-readable code portion comprises a "delete" symbol that is distinct from the superposition of all other symbols in the coding symbol set.

8. The method of claim 7 wherein:
the human-readable code portion comprises a location reserved for a symbol whose location has been deleted by marking that location with the delete symbol.

9. The method of claim 1 wherein:
the machine-readable code portion comprises a vine code.

10. The method of claim 1 wherein:
the machine-readable code portion of the mark comprises a "delete" symbol that comprises a bar longer than any bar in the all other evenly spaced bars.

11. The method of claim 10 wherein:

wherein the machine-readable code portion comprises a location reserved for a symbol whose location has been deleted by marking that location with the delete symbol.

12. The method of claim 1 wherein:

the marking-machine further comprises:
- a first sparse mapping table wherein the machine-readable code portion is an index into the first sparse mapping table; and wherein table lines in the first sparse mapping table, or which there is no corresponding machine-readable code portion, comprise an error indictor.

13. The method of claim 1 wherein:

a second sparse mapping table wherein the human-readable code portion is an index into the second sparse mapping table; and wherein table lines in the second sparse mapping table, for which there is no corresponding human-readable code portion, comprise an error indictor.

14. The method of claim 1 comprising the additional steps:
- (c) verifying the machine-readable code portion is validly tattooed;
- (d) verifying the human-readable code portion is validly tattooed;
- (e) correcting the machine-readable code portion or the human-readable code portion, via additional tattooing, respectively conditional on at least one of the (c) and (d) verifying steps identifies an invalid tattoo.

* * * * *